US009395849B2

(12) United States Patent
Zhang et al.

(10) Patent No.: US 9,395,849 B2
(45) Date of Patent: Jul. 19, 2016

(54) INFRARED TOUCH SCREEN MULTI-POINT RECOGNIZING METHOD AND INFRARED TOUCH SCREEN

(75) Inventors: Haibing Zhang, Beijing (CN); Wujun Wang, Beijing (CN); Jianjun Liu, Beijing (CN); Xinlin Ye, Beijing (CN); Xinbin Liu, Beijing (CN)

(73) Assignee: BEIJING IRTOUCH SYSTEMS CO., LTD, Beijing (CN)

( * ) Notice: Subject to any disclaimer, the term of this patent is extended or adjusted under 35 U.S.C. 154(b) by 152 days.

(21) Appl. No.: 13/989,723

(22) PCT Filed: Oct. 20, 2011

(86) PCT No.: PCT/CN2011/081006
§ 371 (c)(1),
(2), (4) Date: May 24, 2013

(87) PCT Pub. No.: WO2012/068933
PCT Pub. Date: May 31, 2012

(65) Prior Publication Data
US 2013/0234993 A1  Sep. 12, 2013

(30) Foreign Application Priority Data
Nov. 26, 2010  (CN) .......................... 2010 1 0562430

(51) Int. Cl.
G06F 3/042  (2006.01)
G06F 3/041  (2006.01)

(52) U.S. Cl.
CPC ............ *G06F 3/0421* (2013.01); *G06F 3/0418* (2013.01); *G06F 2203/04104* (2013.01)

(58) Field of Classification Search
None
See application file for complete search history.

(56) References Cited

U.S. PATENT DOCUMENTS

| 8,179,408 B2 | 5/2012 | Chen et al. |
| 8,400,406 B1* | 3/2013 | Kurtz .................... G06F 3/0428 345/104 |
| 2008/0273013 A1* | 11/2008 | Levine et al. ................. 345/173 |

(Continued)

FOREIGN PATENT DOCUMENTS

| CN | 101286104 | 10/2008 |
| CN | 101727245 | 6/2010 |

*Primary Examiner* — Srilakshmi K Kumar
*Assistant Examiner* — Parul Gupta
(74) *Attorney, Agent, or Firm* — Harness, Dickey & Pierce, P.L.C.

(57) ABSTRACT

Disclosed are an infrared touch screen multipoint recognizing method and an infrared touch screen. The method comprises the following steps: driving infrared transmitting tubes and infrared receiving tubes to scan a touch detection area and saving scan data (601); reading scan data of the infrared transmitting tubes and the infrared receiving tubes, to determine boundaries of quasi-touch points and obtain a quasi-touch point set (602); reading scan data of the infrared transmitting tubes and the infrared receiving tubes aligned with a first direction off-axis, to obtain a first calibrated touch point set (603); reading scan data of the infrared transmitting tubes and the infrared receiving tubes aligned with a second direction off-axis, to obtain a second calibrated touch point set (604); and comparing the quasi-touch point set, the first calibrated touch point set and the second calibrated touch point set, to eliminate ghost points and determine real touch points (605). The infrared touch screen multi-point recognizing method and the infrared touch screen can recognize multiple touch points through one time of full-screen scanning by using only one set of detecting elements.

16 Claims, 6 Drawing Sheets

(56) References Cited

U.S. PATENT DOCUMENTS

| | | | |
|---|---|---|---|
| 2009/0219256 A1* | 9/2009 | Newton | 345/173 |
| 2009/0278816 A1* | 11/2009 | Colson | 345/175 |
| 2011/0148819 A1* | 6/2011 | Yu | 345/175 |
| 2012/0176345 A1* | 7/2012 | Ye et al. | 345/175 |
| 2013/0027357 A1* | 1/2013 | Liu et al. | 345/175 |

* cited by examiner

INFRARED TOUCH SCREEN MULTI-POINT RECOGNIZING METHOD AND INFRARED TOUCH SCREEN

TECHNICAL FIELD

The present invention relates to the field of photoelectric technology, and specifically, to an infrared touch screen multi-point recognizing method and an infrared touch screen.

DESCRIPTION OF THE RELATED ART

For a long term, a multi-point recognizing method for a conventional infrared touch screen mainly adopts a logic elimination method, including a partitioning method and a time division method. The time division method is to assume that a multi-point touch operation consists of touch operations occurred at different time with operation interval of a few milliseconds, and a second touch point operation will produce a corresponding "ghost" point, while a real second touch point is in a diagonal state with a first touch point, whereby a "ghost" point may be eliminated with the time division method. The partitioning method requires to divide the entire touch screen physically into several areas, for example, a touch screen may be divided into two, three, or four areas, and each area is used to locate one single point touch operation to eliminate "ghost" points generated when the touch point moves; by determining that a touch moves into/from a corresponding area, the real point may be distinguished from "ghost" points. It can be seen that the method of logically eliminating ghost points is carried out under certain conditions, and the logic method cannot be used if multiple points move simultaneously or multiple points are in the same area. Currently, there are also methods of eliminating "ghost" points by adding a second set of hardware or by using oblique scanning in a large angle on the basis of recognizing position, but such methods have some shortcomings such as significant cost increase, high touch screen thickness, high requirements on performance of infrared detecting element (such as an infrared transmitting tube, an infrared receiving tube) itself and low scan rate or being able to recognize only two points, etc.

SUMMARY OF THE INVENTION

In view of the problems existing in the prior art, the present invention proposes a recognizing method by which an infrared touch screen can recognize multiple touch points through one time of full-screen scanning by using only one set of detecting elements, the infrared touch screen comprising infrared transmitting tubes, infrared receiving tubes, a touch detection area and a processing unit, infrared light transmitted by the infrared transmitting tubes being received by at least two infrared receiving tubes through the touch detection area, characterized in that, the method comprises the following steps:

driving the infrared transmitting tubes and the infrared receiving tubes to scan the touch detection area and saving scan data;

reading scan data of the infrared transmitting tubes and infrared receiving tubes, to determine boundaries of quasi-touch points and obtain a quasi-touch point set;

reading scan data of the infrared transmitting tubes and infrared receiving tubes aligned with a first direction off-axis, to obtain a first calibrated touch point set;

reading scan data of the infrared transmitting tubes and infrared receiving tubes aligned with a second direction off-axis, to obtain a second calibrated touch point set; and comparing the quasi-touch point set, the first calibrated touch point set and the second calibrated touch point set, to eliminate ghost points and determine real touch points.

Optionally, the step to obtain the first calibrated touch point set is to calculate barycenters of boundaries of first calibrated touch points obtained by a first direction off-axis scanning.

Optionally, the step to obtain the second calibrated touch point set is to calculate barycenters of boundaries of second calibrated touch points obtained by a second direction off-axis scanning.

Optionally, the first direction off-axis is an off-axis in an angle with an on-axis direction in a counterclockwise direction, and the second direction off-axis is an off-axis in an angle with the on-axis direction in a clockwise direction; or the first direction off-axis is an off-axis in an angle with the on-axis direction in a clockwise direction, and the second direction off-axis is an off-axis in an angle with the on-axis direction in a counterclockwise direction.

Optionally, the angle between the first direction off-axis and the on-axis direction is equal to the angle between the second direction off-axis and the on-axis direction.

Optionally, the step to determine boundaries of quasi-touch points is to read at least one of on-axis scan data, on-axis and off-axis scan data, and off-axis scan data of the infrared transmitting tubes and the infrared receiving tubes to obtain precise boundaries of touch points.

Optionally, the step to obtain a quasi-touch point set is to calculate barycenters of boundaries of quasi-touch points.

Optionally, the step to eliminate ghost points and determine real touch points is to:

compare the quasi-touch point set to the first calibrated touch point set and the second calibrated touch point set, if the sum of distances between a quasi-touch point and a first and second calibrated touch point in the same numbering position is greater than X, then take the quasi-touch point as a ghost point; and if the sum of distances between a quasi-touch point and a first and second calibrated touch point in the same numbering position is less than x, then take the quasi-touch point as a real touch point, wherein, X>x>0.

Optionally, the step to eliminate ghost points and determine real touch points is to:

compare the first calibrated touch point set to the second calibrated touch point set, if the distance between a first calibrated touch point and a second calibrated touch point in the same numbering position is greater than Y, then take a quasi-touch point corresponding to the numbering position as a ghost point; and if the distance between a first calibrated touch point and a second calibrated touch point in the same numbering position is less than y, then take a quasi-touch point corresponding to the numbering position as a real touch point, wherein, Y>y>0.

At the same time, the present invention further provides an infrared touch screen capable of recognizing multiple touch points, the touch screen comprising:

a first plurality of infrared transmitting tubes and a first plurality of infrared receiving tubes located along two opposite edges of a touch detection area, infrared light transmitted by each of the first plurality of infrared transmitting tubes being received by at least two of the first plurality of infrared receiving tubes;

a second plurality of infrared transmitting tubes and a second plurality of infrared receiving tubes located along another two opposite edges of the touch detection area, infrared light transmitted by each of the second plurality of infrared transmitting tubes being received by at least two of the second plurality of infrared receiving tubes;

a first processing module for controlling activation of the first and second plurality of infrared transmitting tubes and controlling activation of the first and second plurality of infrared receiving tubes, and recording on-axis and off-axis scan data of the infrared transmitting tubes and infrared receiving tubes;

a second processing module for calculating touch positions of one or more touch objects on the touch detection area through reading the on-axis and off-axis scan data recorded in the first processing module multiple times.

Optionally, the second processing module is configured to:

read scan data of the infrared transmitting tubes and infrared receiving tubes, to determine boundaries of quasi-touch points and obtain a quasi-touch point set;

read scan data of the infrared transmitting tubes and infrared receiving tubes aligned with a first direction off-axis, to obtain a first calibrated touch point set;

read scan data of the infrared transmitting tubes and infrared receiving tubes aligned with a second direction off-axis, to obtain a second calibrated touch point set; and compare the quasi-touch point set, the first calibrated touch point set and the second calibrated touch point set, to eliminate ghost points and determine real touch points.

Optionally, to obtain the first calibrated touch point set is to calculate barycenters of boundaries of first calibrated touch points obtained by a first direction off-axis scanning.

Optionally, to obtain the second calibrated touch point set is to calculate barycenters of boundaries of second calibrated touch points obtained by a second direction off-axis scanning.

Optionally, the first direction off-axis is an off-axis in an angle with an on-axis direction in a counterclockwise direction, and the second direction off-axis is an off-axis in an angle with the on-axis direction in a clockwise direction; or the first direction off-axis is an off-axis in an angle with the on-axis direction in a clockwise direction, and the second direction off-axis is an off-axis in an angle with the on-axis direction in a counterclockwise direction.

Optionally, the angle between the first direction off-axis and the on-axis direction is equal to the angle between the second direction off-axis and the on-axis direction.

Optionally, to determine boundaries of quasi-touch points is to read at least one of on-axis scan data, on-axis and off-axis scan data, and off-axis scan data of the infrared transmitting tube and the infrared receiving tube to obtain precise boundaries of touch points.

Optionally, to obtaining a quasi-touch point set is to calculate barycenters of boundaries of quasi-touch points.

Optionally, to eliminate ghost points and determine real touch points is to:

compare the quasi-touch point set to the first calibrated touch point set and the second calibrated touch point set, if the sum of distances between a quasi-touch point and a first and second calibrated touch point in the same numbering position is greater than X, then take the quasi-touch point as a ghost point; and if the sum of distances between a quasi-touch point and a first and second calibrated touch point in the same numbering position is less than x, then take the quasi-touch point as a real touch point, wherein, X>x>0.

Optionally, to eliminate ghost points and determine real touch points is to:

compare the first calibrated touch point set to the second calibrated touch point set, if the distance between a first calibrated touch point and a second calibrated touch point in the same numbering position is greater than Y, then take a quasi-touch point corresponding to the numbering position as a ghost point; and if the distance between a first calibrated touch point and a second calibrated touch point in the same numbering position is less than y, then take a quasi-touch point corresponding to the numbering position as a real touch point, wherein, Y>y>0.

Compared with the prior art, the infrared touch screen multi-point recognizing method and the infrared touch screen provided in the present invention at least have the following advantages:

the infrared touch screen multi-point recognizing method provided in the present invention completes one time of full-screen scanning on the basis of only one set of detection elements, and uses improved algorithm to read scan data multiple times, so as to obtain a quasi-touch point set, a first calibrated touch point set and a second calibrated touch point set. Then, it compares the quasi-touch point set to the first calibrated touch point set and the second calibrated touch point set; if the sum of distances between a quasi-touch point and a first and second calibrated touch point in the same numbering position is greater than X, then the quasi-touch point is taken as a ghost point; and if the sum of distances between a quasi-touch point and two calibrated touch points in the same numbering position is less than x, then the quasi-touch point is taken as a real touch point, wherein, X>x>0; or it compares the first calibrated touch point set to the second calibrated touch point set; if the distance between two calibrated touch points in the same numbering position is greater than Y, then a corresponding quasi-touch point is taken as a ghost point; and if the distance between two calibrated touch points in the same numbering position is less than y, then a corresponding quasi-touch point is taken as a real touch point, wherein, Y>y>0.

The infrared touch screen provided in the present invention is added with a first processing module and a second processing module, the first processing module controlling activation of a first and second plurality of infrared transmitting tubes and controlling activation of a first and second plurality of infrared receiving tubes, and recording on-axis and off-axis scan data of the infrared transmitting tubes and infrared receiving tubes; the second processing module calculating touch positions of one or more touch objects on a touch detection area through reading the on-axis and off-axis scan data recorded in the first processing module multiple times. With the first and second processing module added, the infrared touch screen may recognize multiple touch points through one time of full-screen scanning by using only one set of detecting elements.

Other aspects and/or advantages of the present invention will be described in part in the following description, and a part of them is evident in this description, or may be learned through practice of the present invention.

BRIEF DESCRIPTION OF THE DRAWINGS

Through reading the following detailed description with reference to the following drawings, the present invention can be better understood. It should be noted that the detail in the drawings is not drawn proportionally. On the contrary, for the sake of clarity, various details are arbitrarily magnified or minified, in which.

DETAILED DESCRIPTION OF THE PREFERRED EMBODIMENT

Embodiments of the present invention will be described below in detail according to the attached drawings wherein the same reference signs refer to the same elements. The present invention will be explained by describing the embodiments with reference to the attached drawings.

Figure 1:
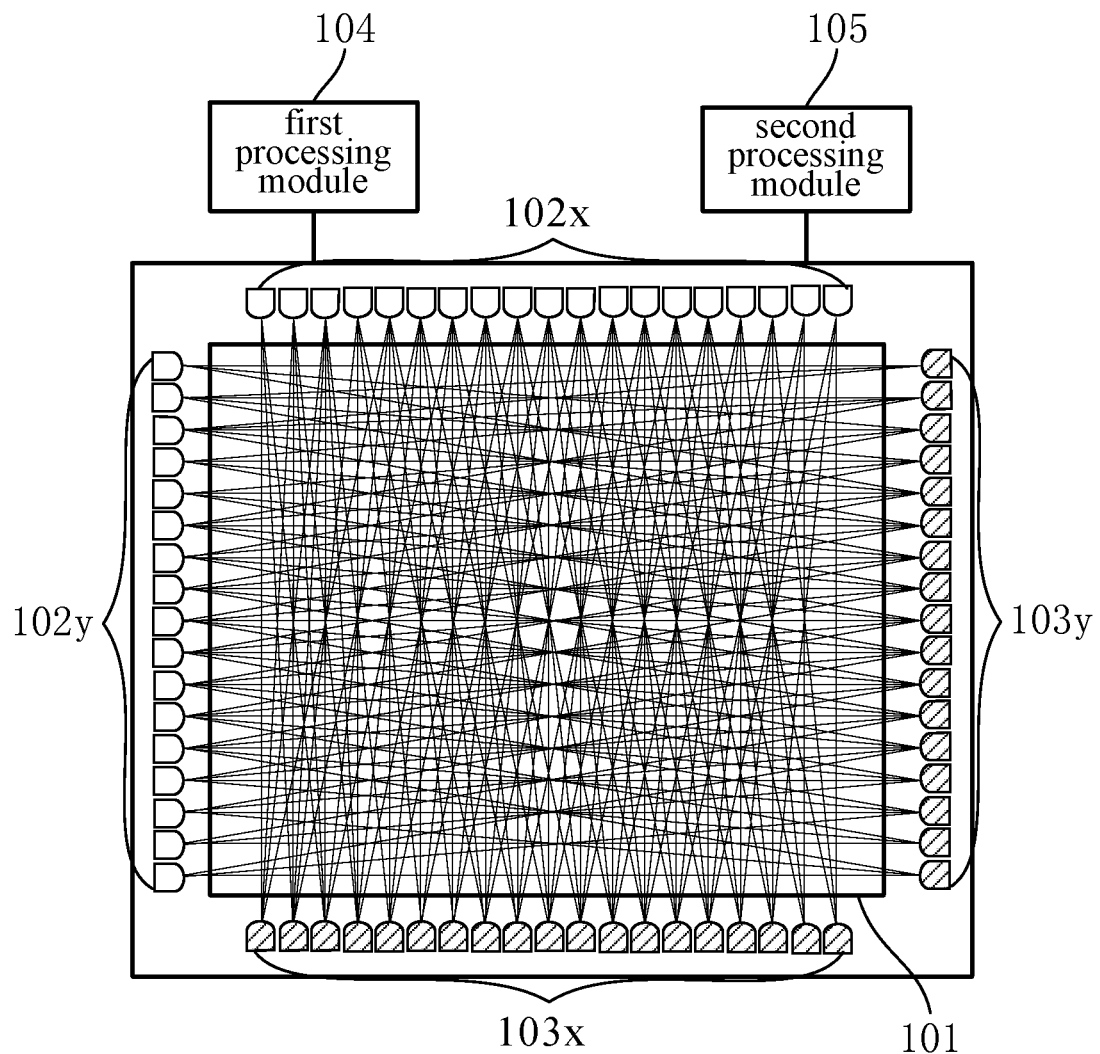
FIG. 1 is a schematic structural diagram according to a first embodiment of an infrared touch screen of the present invention.
Figure 2:
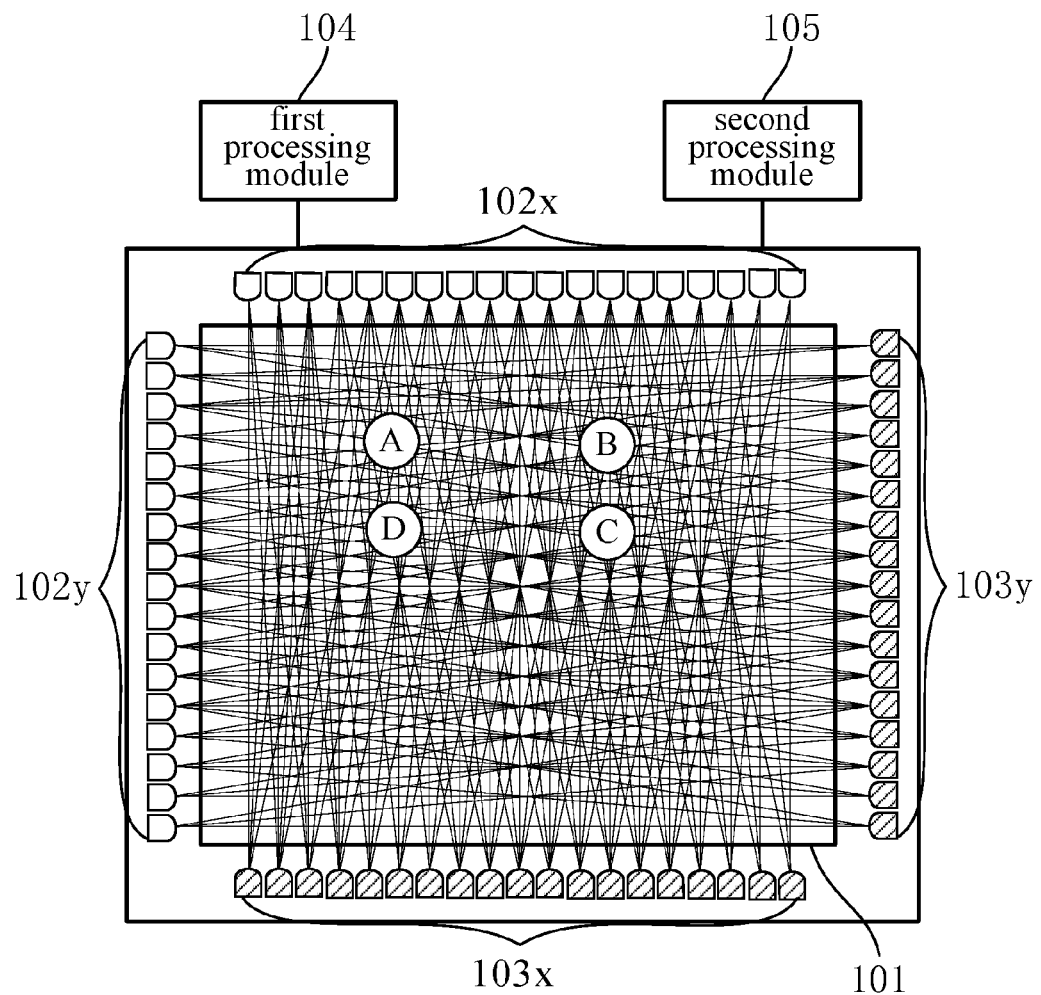
FIG. 2 is a schematic diagram of the infrared touch screen shown in FIG. 1 obtaining quasi-touch points.

FIG. 1 is a schematic structural diagram according to an embodiment of an infrared touch screen of the present invention. As shown, the infrared touch screen comprises: a first plurality of infrared transmitting tubes 102x and a first plurality of infrared receiving tubes 103x located along two opposite edges (two edges of a touch detection area 101 in an x-axis direction shown in this embodiment) of the touch detection area 101, infrared light transmitted by each of the first plurality of infrared transmitting tubes 102x being received by at least two of the first plurality of infrared receiving tubes 103x; a second plurality of infrared transmitting tubes 102y and a second plurality of infrared receiving tubes 103y located along another two opposite edges (two edges of the touch detection area 101 in a y-axis direction shown in this embodiment) of the touch detection area 101, infrared light transmitted by each of the second plurality of infrared transmitting tubes 102y being received by at least two of the second plurality of infrared receiving tubes 103y; a first processing module 104 for controlling activation of the first plurality of infrared transmitting tubes 102x and second plurality of infrared transmitting tubes 102y and controlling activation of the first plurality of infrared receiving tubes 103x and second plurality of infrared receiving tubes 103y, and for recording the on-axis and off-axis scan data of the infrared transmitting tubes and infrared receiving tubes; and a second processing module 105 for calculating touch positions of one or more touch objects on the touch detection area 101 through reading the on-axis and off-axis scan data recorded in the first processing module 104 multiple times. The second processing module 105 first reads the scan data of the infrared transmitting tubes and the infrared receiving tubes to determine boundaries of quasi-touch points, wherein the determining boundaries of quasi-touch points is to read at least one of on-axis scan data, on-axis and off-axis scan data, and off-axis scan data of the infrared transmitting tubes and the infrared receiving tubes to obtain precise boundaries of touch points, and then the second processing module calculates barycenters of the boundaries of quasi-touch points, which are coordinate positions of the quasi-touch points, to obtain a quasi-touch point set. In combination with FIG. 2, the quasi-touch point set consists of touch points A, B, C, D. The second processing module 105 further reads the scan data of the infrared transmitting tubes and the infrared receiving tubes aligned with a first direction off-axis recorded in the first processing module, wherein the first direction off-axis is an off-axis in an angle with an on-axis direction in a counter-clockwise direction, and calculates barycenters of boundaries of first calibrated touch points, which are coordinate positions of the first calibrated touch points, obtained by a first direction off-axis scanning, to obtain a first calibrated touch point set.

Figure 3:
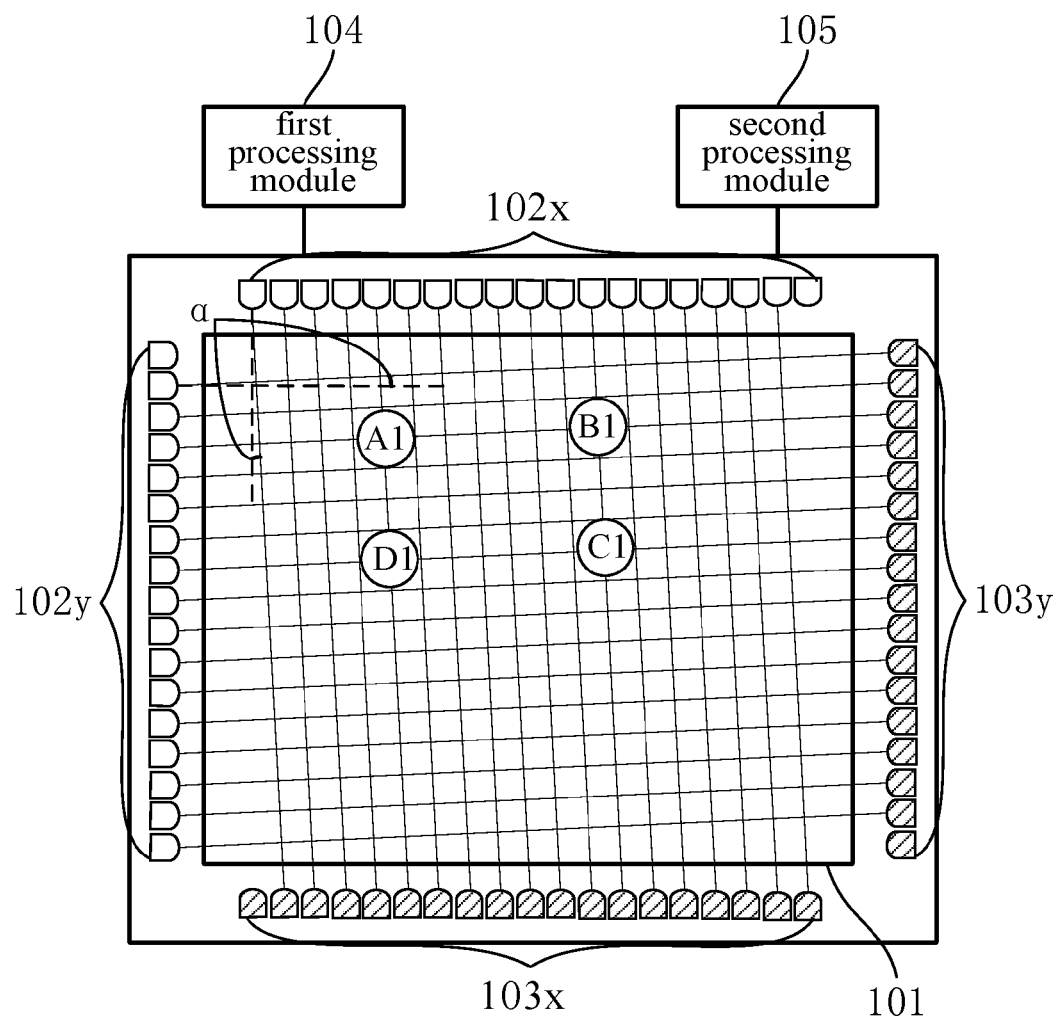
FIG. 3 is a schematic diagram of the infrared touch screen shown in FIG. 1 obtaining first calibrated touch points.
Figure 4:
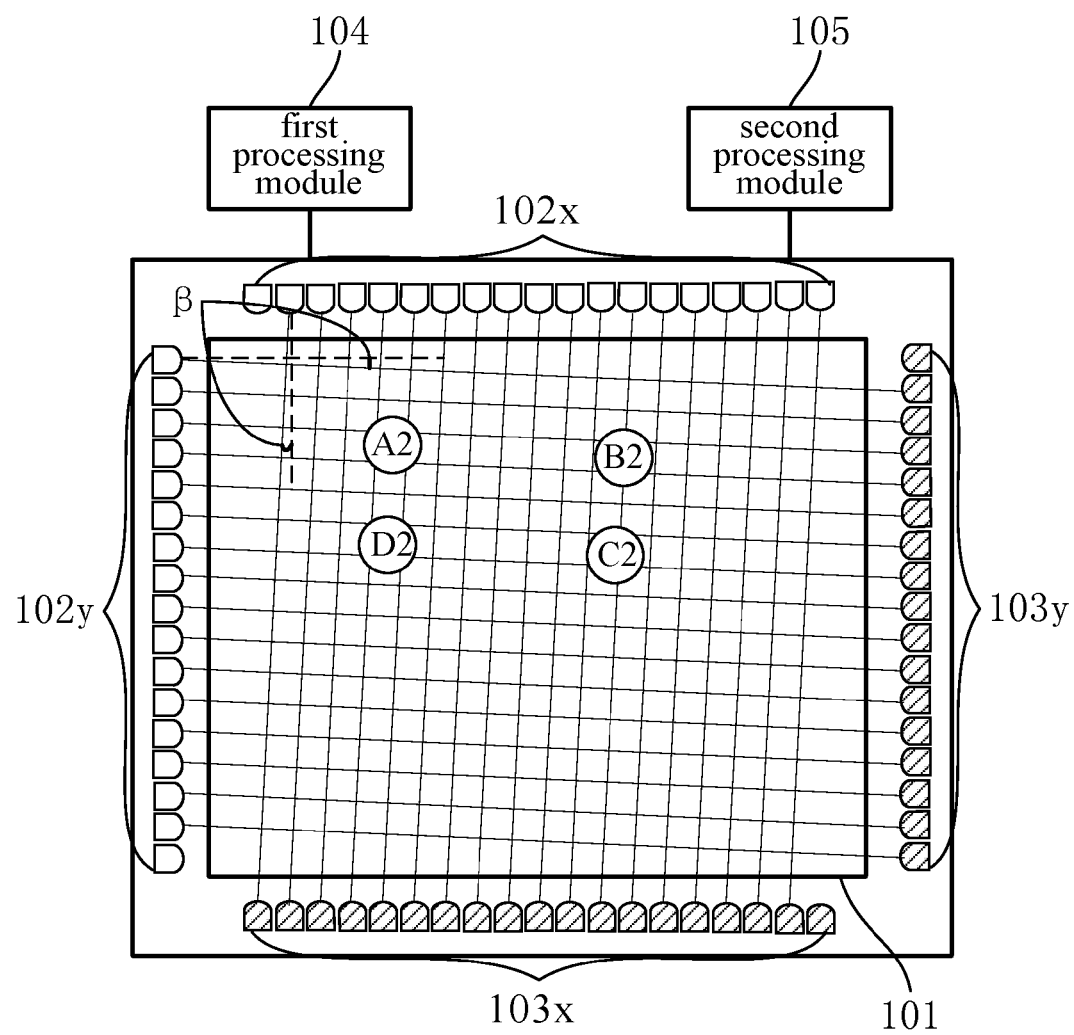
FIG. 4 is a schematic diagram of the infrared touch screen shown in FIG. 1 obtaining second calibrated touch points.
Figure 5:
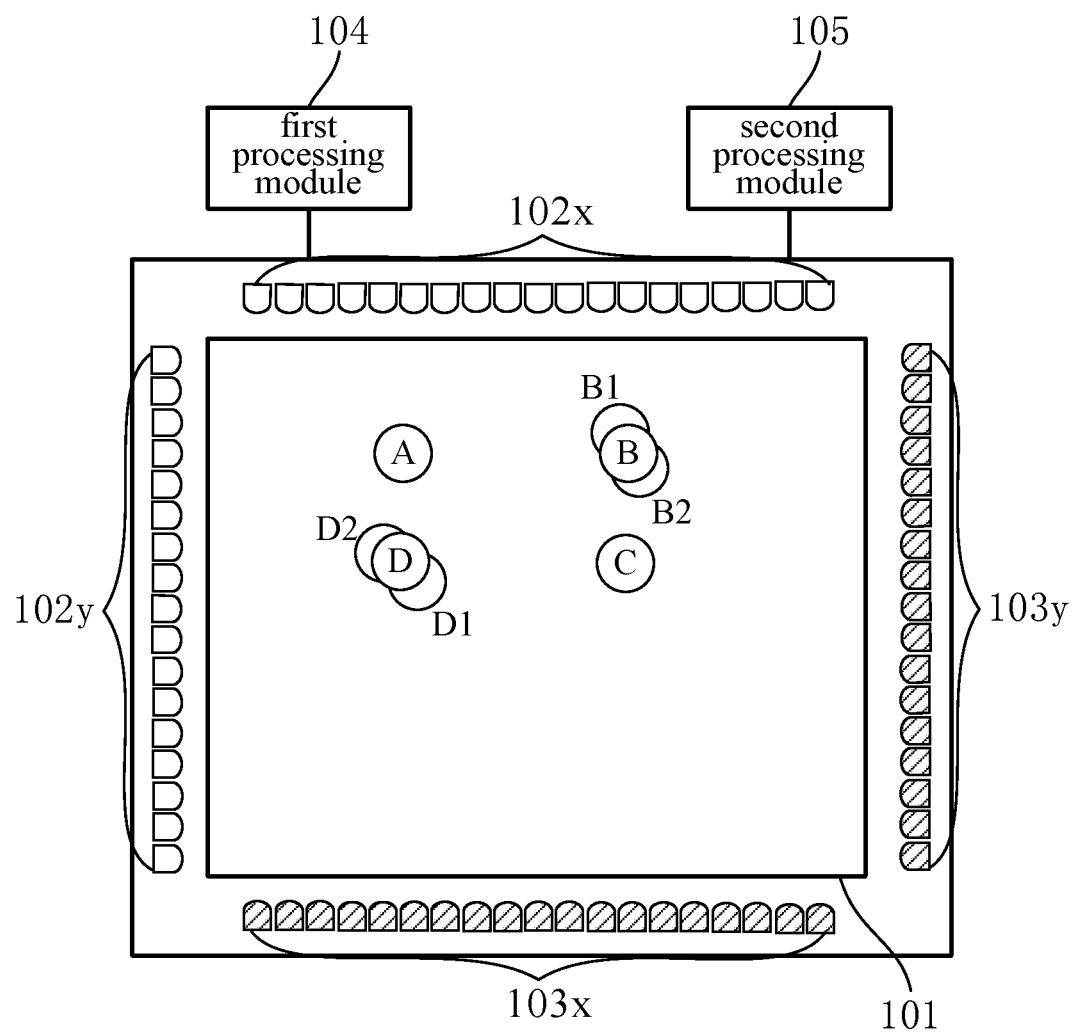
FIG. 5 is a schematic diagram of the infrared touch screen shown in FIG. 1 eliminating ghost points and recognizing real touch points.

In combination with FIG. 3, the first direction off-axis is in an angle $\alpha$ with the on-axis direction, the first calibrated touch point set consists of touch points A1, B1, C1, D1. The second processing module 105 further reads the scan data of the infrared transmitting tubes and the infrared receiving tubes aligned with a second direction off-axis recorded in the first processing module, wherein the second direction off-axis is an off-axis in an angle with an on-axis direction in a clockwise direction, and then calculates barycenters of boundaries of second calibrated touch points, which are coordinate positions of the second calibrated touch points, obtained by a second direction off-axis scanning, to obtain a second calibrated touch point set. In combination with FIG. 4, the second direction off-axis is in an angle $\beta$ with the on-axis direction, and the second calibrated touch point set consists of touch points A2, B2, C2, D2. Based on this, the second processing module 105 compares the quasi-touch point set to the first calibrated touch point set and the second calibrated touch point set. If the sum of distances between a quasi-touch point and a first and second calibrated touch point in the same numbering position is greater than X, then the quasi-touch point is a ghost point; and if the sum of distances between a quasi-touch point and two calibrated touch points in the same numbering position is less than x, then the quasi-touch point is a real touch point, wherein, X>x>0. Or the second processing module 105 compares the first calibrated touch point set to the second calibrated touch point set. If the distance between a first calibrated touch point and a second calibrated touch point in the same numbering position is greater than Y, then a quasi-touch point corresponding to the numbering position is a ghost point; if the distance between a first calibrated touch point and a second calibrated touch point in the same numbering position is less than y, then a quasi-touch point corresponding to the numbering position is a real touch point, wherein, Y>y>0. In combination with FIG. 5, A, A1, A2 correspond to the same numbering position, B, B1, B2 correspond to the same numbering position, C, C1, C2 correspond to the same numbering position, D, D1, D2 correspond to the same numbering position, and X, x, Y, y are preset determination thresholds. To compare the sum of distances between a quasi-touch point and two calibrated touch points in the same numbering position is to compare the values of a, b, c, d, wherein a=AA1+AA2, b=BB1+BB2, c=CC1+CC2, d=DD1+DD2. Through calculation, a and c are less than x, and b and d are greater than X, then quasi-touch points A and C are real touch points, quasi-touch points B, D are ghost points; or the distances between two calibrated touch points in the same numbering position are compared, that is, distances A1A2, B1B2, C1C2, D1D2 are compared. Through calculation, A1A2 and C1C2 are less than y, and B1B2 and D1D2 are greater than Y, then quasi-touch points A, C are real touch points and quasi touch points B, D are ghost points.

It should be noted that X, x, Y, y are preset determination thresholds. The first direction off-axis may also be an off-axis in an angle with the on-axis direction in a clockwise direction, and the second direction off-axis may also be an off-axis in an angle with the on-axis direction in a counterclockwise direction. Preferably, the angle between the first direction off-axis and the on-axis direction is equal to the angle between the second direction off-axis and the on-axis direction. At the same time, the infrared touch screen of the invention can also recognize multiple touch points more than two points, its principle being the same as that for recognizing two touch points.

Figure 6:
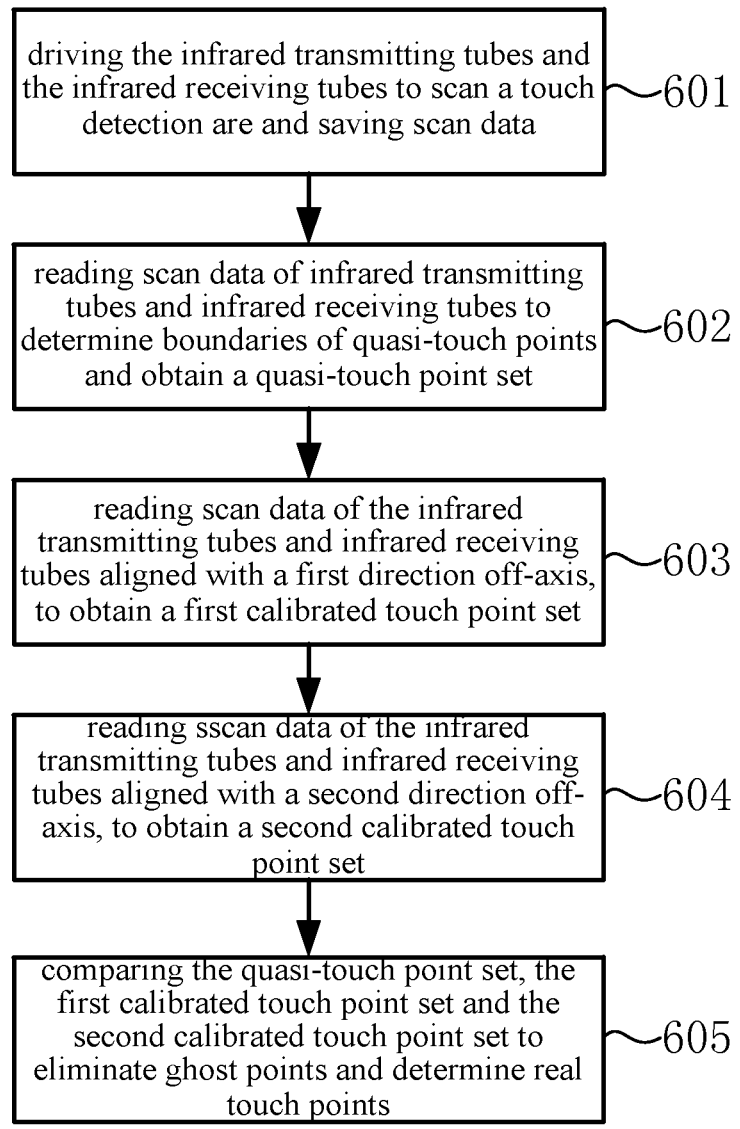
FIG. 6 is a schematic flowchart of an embodiment of an infrared touch screen multi-point recognizing method of the present invention.

FIG. 6 is a schematic flowchart of an embodiment of an infrared touch screen multi-point recognizing method of the present invention, the infrared touch screen comprising infrared transmitting tubes, infrared receiving tubes, a touch detection area and a processing unit, infrared light transmitted by the infrared transmitting tubes being received by at least two infrared receiving tubes through the touch detection area. The method comprises the following steps.

In step 601, the infrared transmitting tubes and the infrared receiving tubes are driven to scan the touch detection area and the scan data are saved.

The infrared touch screen as shown in FIG. 1 performs this step. Specifically, the first processing module 104 controls activation of the first plurality of infrared transmitting tubes 102$x$ and the second plurality of infrared transmitting tubes 102$y$ and controls activation of the first plurality of infrared receiving tubes 103$x$ and the second plurality of infrared receiving tubes 103$y$, and records the scan data of the infrared transmitting tubes and infrared receiving tubes, the scan data including on-axis scan data and off-axis scan data.

Now proceeds to step 602 of reading the scan data of the infrared transmitting tubes and infrared receiving tubes aligned on-axis, to determine boundaries of quasi-touch points and obtain a quasi-touch point set.

The infrared touch screen as shown in FIG. 1 performs this step. Specifically, the second processing module reads the scan data of the infrared transmitting tubes and the infrared receiving tubes recorded in the first processing module, to determine boundaries of quasi-touch points, wherein to determine boundaries of quasi-touch points is to read at least one of on-axis scan data, on-axis and off-axis scan data, and off-axis scan data of the infrared transmitting tubes and the infrared receiving tubes to obtain precise boundaries of touch points, and then the second processing module calculates the barycenters of the boundaries of quasi-touch points, which are coordinate positions of the quasi-touch points, to obtain the quasi-touch point set. In combination with FIG. 2, the quasi-touch point set consists of touch points A, B, C, D.

Now proceeds to step 603 of reading the scan data of the infrared transmitting tubes and infrared receiving tubes aligned with a first direction off-axis to obtain a first calibrated touch point set.

The infrared touch screen as shown in FIG. 1 performs this step. Specifically, the second processing module reads the scan data of the infrared transmitting tubes and the infrared receiving tubes aligned with a first direction off-axis recorded in the first processing module, wherein the first direction off-axis is an off-axis in an angle with an on-axis direction in a counterclockwise direction, and the second processing module calculates barycenters of boundaries of first calibrated touch points, which are coordinate positions of the first calibrated touch points, obtained by a first direction off-axis scanning, to obtain the first calibrated touch point set. In combination with FIG. 3, the first direction off-axis is in an angle α with the on-axis direction, and the first calibrated touch point set consists of touch points A1, B1, C1, D1.

Now proceeds to step 604 of reading the scan data of the infrared transmitting tubes and infrared receiving tubes aligned with a second direction off-axis to obtain a second calibrated touch point set.

The infrared touch screen as shown in FIG. 1 performs this step. Specifically, the second processing module reads the scan data of the infrared transmitting tubes and the infrared receiving tubes aligned with a second direction off-axis recorded in the first processing module, wherein the second direction off-axis is an off-axis in an angle with an on-axis direction in a clockwise direction, and then the second processing module calculates barycenters of boundaries of second calibrated touch points, which are coordinate positions of the second calibrated touch points, obtained by a second direction off-axis scanning, to obtain the second calibrated touch point set. In combination with FIG. 4, the second direction off-axis is in an angle β with the on-axis direction, and the second calibrated touch point set consists of touch points A2, B2, C2, D2.

Now proceeds to step 605 of comparing the quasi-touch point set, the first calibrated touch point set and the second calibrated touch point set to eliminate ghost points and to determine real touch points.

The infrared touch screen as shown in FIG. 1 performs this step. Specifically, the second processing module 105 compares the quasi-touch point set to the first calibrated touch point set and the second calibrated touch point set. If the sum of distances between a quasi-touch point and a first and second calibrated touch point in the same numbering position is greater than X, then the quasi-touch point is a ghost point; and if the sum of distances between a quasi-touch point and two calibrated touch points in the same numbering position is less than x, then the quasi-touch point is a real touch point, wherein, X>x>0. Or the second processing module compares the first calibrated touch point set to the second calibrated touch point set. If the distance between a first calibrated touch point and a second calibrated touch point in the same numbering position is greater than Y, then a quasi-touch point corresponding to the numbering position is a ghost point; and if the distance between a first calibrated touch point and a second calibrated touch point in the same numbering position is less than y, then a quasi-touch point corresponding to the numbering position is a real touch point, wherein, Y>y>0. In combination with FIG. 5, A, A1, A2 correspond to the same numbering position, B, B1, B2 correspond to the same numbering position, C, C1, C2 correspond to the same numbering position, D, D1, D2 correspond to the same numbering position, and X, x, Y, y are preset determination thresholds. To compare the sum of distances between a quasi-touch point and two calibrated touch points in the same numbering position is to compare the values of a, b, c, d, wherein a=AA1+AA2, b=BB1+BB2, c=CC1+CC2, d=DD1+DD2. Through calculation, a and c are less than x, and b and d are greater than X, then quasi-touch points A, C are real touch points, quasi-touch points B, D are ghost points; or the distances between two calibrated touch points in the same numbering position are compared, that is, distances of A1A2, B1B2, C1C2, D1D2 are compared. Through calculation, A1A2 and C1C2 are less than y, and B1B2 and D1D2 are greater than Y, then quasi-touch points A, C are real touch points and quasi touch points B, D are ghost points.

It should be noted that the first direction off-axis may also be an off-axis in an angle with the on-axis direction in a clockwise direction, and the second direction off-axis may also be an off-axis in an angle with the on-axis direction in a counterclockwise direction. Preferably, the angle between the first direction off-axis and the on-axis direction is equal to the angle between the second direction off-axis and the on-axis direction. At the same time, the infrared touch screen multi-point recognizing method of the invention can also recognize multiple touch points more than two points, its principle being the same as that for recognizing two touch points.

Although the embodiments of the present invention have been described and specified in detail, those skilled in the art should appreciate that changes may be made to these embodiments without departing the spirit and principles of the present invention, and fall within the scope defined in the claims.

The invention claimed is:

1. An infrared touch screen multi-point recognizing method, the infrared touch screen comprising infrared transmitting tubes, infrared receiving tubes, a touch detection area and a processing unit, infrared light transmitted by the infrared transmitting tubes being received by at least two infrared receiving tubes through the touch detection area, the method comprises the following steps:
   driving the infrared transmitting tubes and the infrared receiving tubes to scan the touch detection area and saving scan data;
   reading scan data of the infrared transmitting tubes and infrared receiving tubes, to determine boundaries of quasi-touch points and obtain a quasi-touch point set;
   reading scan data of only the infrared transmitting tubes and infrared receiving tubes aligned with a first off-axis direction, to obtain a first calibrated touch point set;
   reading scan data of only the infrared transmitting tubes and infrared receiving tubes aligned with a second off-axis direction, to obtain a second calibrated touch point set; and
   comparing the quasi-touch point set, the first calibrated touch point set and the second calibrated touch point set, to eliminate ghost points and determine real touch points,
   the first off-axis direction including an off-axis in an angle with an on-axis direction in a counterclockwise direction and the second off-axis direction including an off-axis in an angle with the on-axis direction in a clockwise direction, or the first off-axis direction including an off-axis in an angle with the on-axis direction in a clockwise direction and the second off-axis direction including an off-axis in an angle with the on-axis direction in a counterclockwise direction.

2. The infrared touch screen multi-point recognizing method according to claim 1, characterized in that the step to obtain the first calibrated touch point set is to calculate barycenters of boundaries of first calibrated touch points obtained by a first off-axis direction scanning.

3. The infrared touch screen multi-point recognizing method according to claim 1, characterized in that the step to obtain the second calibrated touch point set is to calculate barycenters of boundaries of second calibrated touch points obtained by a second off-axis direction scanning.

4. The infrared touch screen multi-point recognizing method according to claim 1, characterized in that the angle between the first off-axis direction and the on-axis direction is equal to the angle between the second off-axis direction and the on-axis direction.

5. The infrared touch screen multi-point recognizing method according to claim 1, characterized in that the step to determine boundaries of quasi-touch points is to read at least one of on-axis scan data, on-axis and off-axis scan data, and off-axis scan data of the infrared transmitting tubes and the infrared receiving tubes to obtain precise boundaries of touch points.

6. The infrared touch screen multi-point recognizing method according to claim 1, characterized in that the step to obtain a quasi-touch point set is to calculate barycenters of boundaries of quasi-touch points.

7. The infrared touch screen multi-point recognizing method according to claim 1, characterized in that the step to eliminate ghost points and determine real touch points is to:
   compare the quasi-touch point set to the first calibrated touch point set and the second calibrated touch point set, if the sum of distances between a quasi-touch point and a first and second calibrated touch point in the same numbering position is greater than X, then take the quasi-touch point as a ghost point; and if the sum of distances between a quasi-touch point and a first and second calibrated touch point in the same numbering position is less than x, then take the quasi-touch point as a real touch point, wherein, $X>x>0$.

8. The infrared touch screen multi-point recognizing method according to claim 1, characterized in that the step to eliminate ghost points and determine real touch points is to:
   compare the first calibrated touch point set to the second calibrated touch point set, if the distance between a first calibrated touch point and a second calibrated touch point in the same numbering position is greater than Y, then take a quasi-touch point corresponding to the numbering position as a ghost point; and if the distance between a first calibrated touch point and a second calibrated touch point in the same numbering position is less than y, then take a quasi-touch point corresponding to the numbering position as a real touch point, wherein, $Y>y>0$.

9. An infrared touch screen, comprising:
   a first plurality of infrared transmitting tubes and a first plurality of infrared receiving tubes located along two opposite edges of a touch detection area, infrared light transmitted by each of the first plurality of infrared transmitting tubes being received by at least two of the first plurality of infrared receiving tubes;
   a second plurality of infrared transmitting tubes and a second plurality of infrared receiving tubes located along another two opposite edges of the touch detection area, infrared light transmitted by each of the second plurality of infrared transmitting tubes being received by at least two of the second plurality of infrared receiving tubes;
   a first processing module for controlling activation of the first and second plurality of infrared transmitting tubes and controlling activation of the first and second plurality of infrared receiving tubes, and recording on-axis and off-axis scan data of the infrared transmitting tubes and infrared receiving tubes; and
   a second processing module configured to read scan data of the infrared transmitting tubes and infrared receiving tubes to determine boundaries of quasi-touch points and obtain a quasi-touch point set, read scan data of only the infrared transmitting tubes and infrared receiving tubes aligned with a first off-axis direction to obtain a first calibrated touch point set, read scan data of only the infrared transmitting tubes and infrared receiving tubes aligned with a second off-axis direction to obtain a second calibrated touch point set, and compare the quasi-touch point set, the first calibrated touch point set and the second calibrated touch point set to eliminate ghost points and determine real touch points, the first off-axis direction including an off-axis in an angle with an on-axis direction in a counterclockwise direction and the second off-axis direction including an off-axis in an angle with the on-axis direction in a clockwise direction, or the first off-axis direction including an off-axis in an angle with the on-axis direction in a clockwise direction and the second off-axis direction including an off-axis in an angle with the on-axis direction in a counterclockwise direction.

10. The infrared touch screen according to claim 9, characterized in that the obtaining the first calibrated touch point set is to calculate barycenters of boundaries of first calibrated touch points obtained by a first off-axis direction scanning.

11. The infrared touch screen according to claim 9, characterized in that to obtain the second calibrated touch point set is to calculate barycenters of boundaries of second calibrated touch points obtained by a second off-axis direction scanning.

12. The infrared touch screen according to claim 9, characterized in that the angle between the first off-axis direction and the on-axis direction is equal to the angle between the second off-axis direction and the on-axis direction.

13. The infrared touch screen according to claim 9, characterized in that to determine boundaries of quasi-touch points is to read at least one of on-axis scan data, on-axis and off-axis scan data, and off-axis scan data of the infrared transmitting tubes and the infrared receiving tubes to obtain precise boundaries of touch points.

14. The infrared touch screen according to claim 9, characterized in that to obtain a quasi-touch point set is to calculate barycenters of boundaries of quasi-touch points.

15. The infrared touch screen according to claim 9, characterized in that to eliminate ghost points and determine real touch points is to:
   compare the quasi-touch point set to the first calibrated touch point set and the second calibrated touch point set, if the sum of distances between a quasi-touch point and a first and second calibrated touch point in the same numbering position is greater than X, then take the quasi-touch point as a ghost point; and if the sum of distances between a quasi-touch point and a first and second calibrated touch point in the same numbering position is less than x, then take the quasi-touch point as a real touch point, wherein, $X>x>0$.

16. The infrared touch screen according to claim 9, characterized in that to eliminate ghost points and determine real touch points is to:
   compare the first calibrated touch point set to the second calibrated touch point set, if the distance between a first calibrated touch point and a second calibrated touch point in the same numbering position is greater than Y, then take a quasi-touch point corresponding to the numbering position as a ghost point; and if the distance between a first calibrated touch point and a second calibrated touch point in the same numbering position is less than y, then take a quasi-touch point corresponding to the numbering position as a real touch point, wherein, $Y>y>0$.

* * * * *